July 14, 1953 — A. L. OTIS — 2,645,011

DEHORNING DEVICE

Filed April 28, 1952 — 3 Sheets-Sheet 1

INVENTOR.
Allan L. Otis
BY Grehl Wells
Atty.

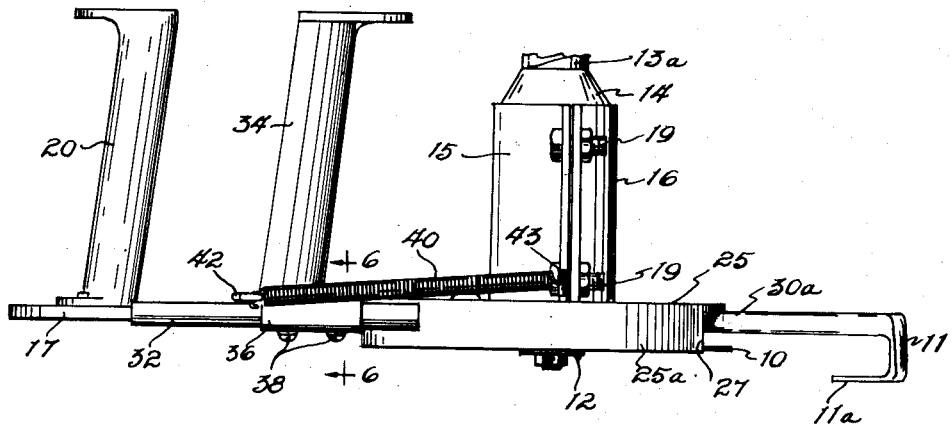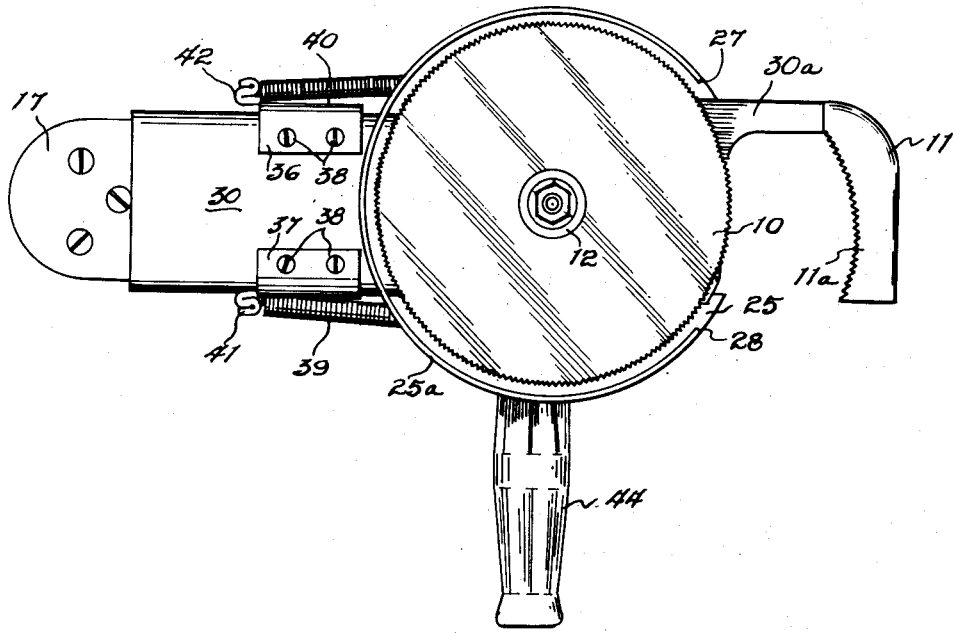

INVENTOR.
Allan L. Otis
BY
Gruhl Wells
Atty.

Patented July 14, 1953

2,645,011

UNITED STATES PATENT OFFICE 2,645,011

DEHORNING DEVICE

Allan L. Otis, White Bird, Idaho

Application April 28, 1952, Serial No. 284,841

5 Claims. (Cl. 30—167)

The present invention relates to a dehorning device for use in removing the horns of cattle. It is common practice to remove the horns from cattle in order to prevent them from damaging each other when they are crowded together and to avoid damage to those who work among the cattle. Various methods and means have been provided for this purpose but none of them have received universal popularity. Usually the horns are removed when the cattle are yearlings, although they may be removed at any age. The greatest drawback to the removal is the injury done to the animal and the resulting loss of weight and growth which occurs because of removing the horns. One of the reasons for the loss is due to the shock and the excitement incident to taking the horns off by the slow method of sawing them off by hand. There are pincer types of dehorning devices which are faster but they do crush the horn in many cases and seem to cause a more lasting damage than the sawing. Sawing is an ideal way of removing the horns because the horn is a hard material that saws readily. It is the purpose of my invention therefore to provide a dehorning device which uses a power driven saw and which is so constructed that it can be quickly applied to the animal so that the actual sawing operation is very quickly accomplished with a minimizing of the shock to the animal.

The nature and advantages of my invention will appear more fully from the following description and the accompanying drawings which illustrate a preferred form of the invention. It should be understood, however, that the drawings and description are illustrative only and are not intended to limit the invention except insofar as it is limited by the claims.

In the drawings:

Figure 3 is a view in side elevation of the device;

Figure 4 is a bottom plan view of the device;

Figure 7:
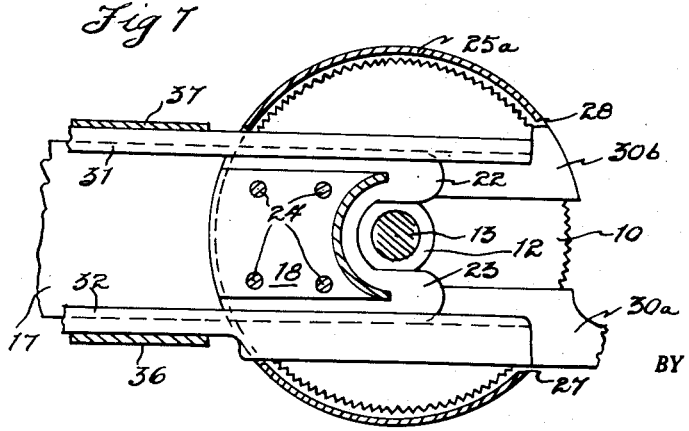
Figure 7 is a fragmentary sectional view taken substantially on the line 7—7 of Figure 5.

Referring now in detail to the drawings, my dehorning device comprises a circular saw 10 having a hook member 11 adapted to hook around a horn and pull it into engagement with the saw. The saw is secured on an arbor 12 which is mounted on one end of a flexible shaft 13. The flexible shaft 13 has a bearing member 14 on the end thereof which is mounted between two halves 15 and 16 of a split sleeve. The flexible shaft unit 13 and its bearing member 14 with the arbor 12 can be purchased as a standard piece of equipment, so the details thereof are not shown in this application. The split sleeve portion 15 is secured to a supporting and guide member 17 by a flange 18 provided on the portion 15. The other half 16 of the split sleeve is bolted to the half 15 by bolts 19. The member 17 has a hand grip 20 secured thereon and is divided (see Figure 7) to provide two arms 22 and 23 which receive the shaft 13 between them. Screws 24 secure the flange 18 to the member 17. These screws also secure a shallow cup-shaped guard 25 to the member 17. The guard 25 is apertured at 26 so that the member 17 extends through it. It is also cut away on the side facing the hook 11 as indicated at 27 and 28 to allow the saw to engage a horn pressed toward it by the hook 11.

Figure 1:
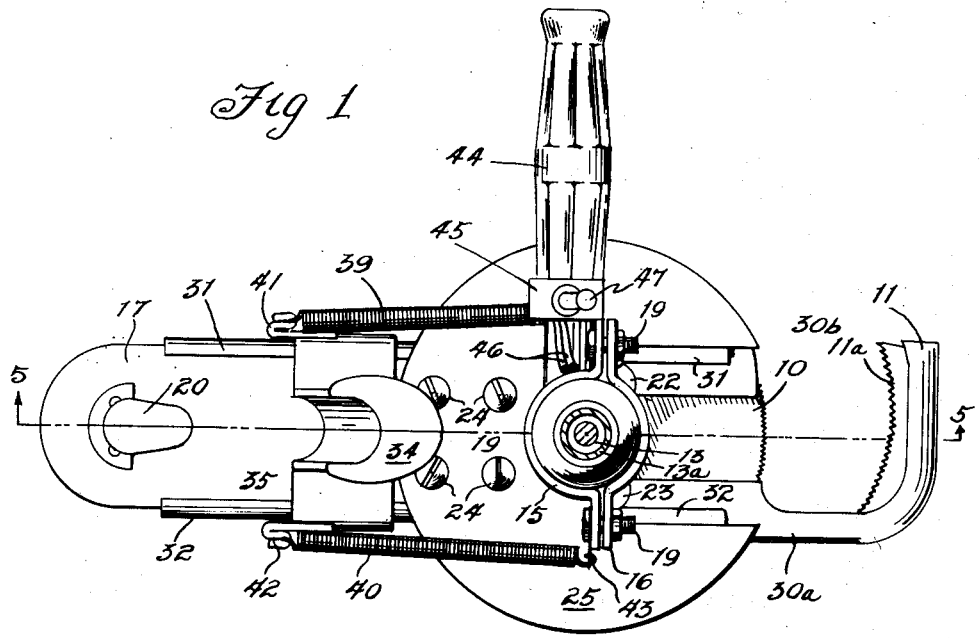
Figure 1 is a plan view of a dehorning device embodying my invention.
Figure 2:
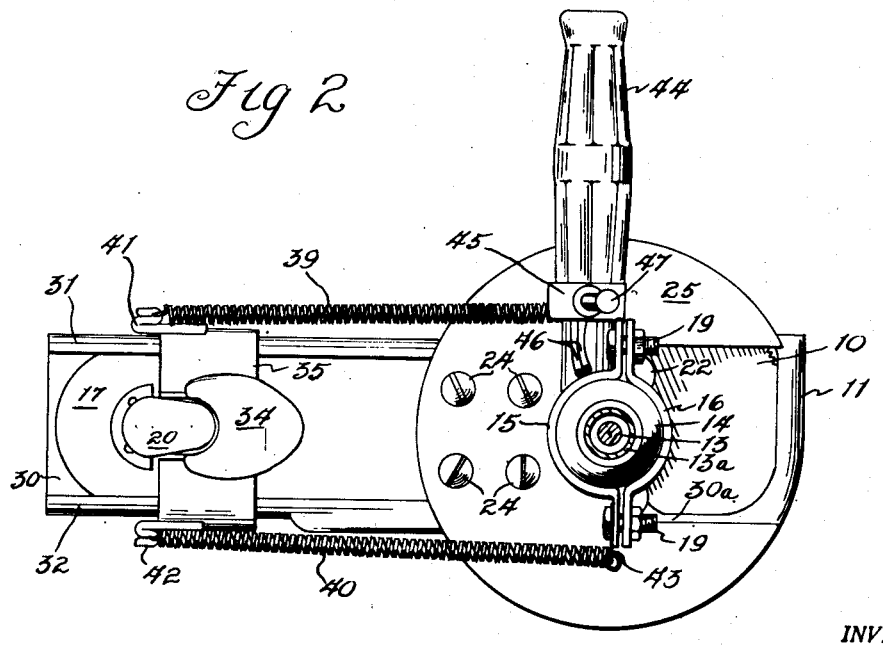
Figure 2 is a view like Figure 1, showing the parts in a changed position.
Figure 5:
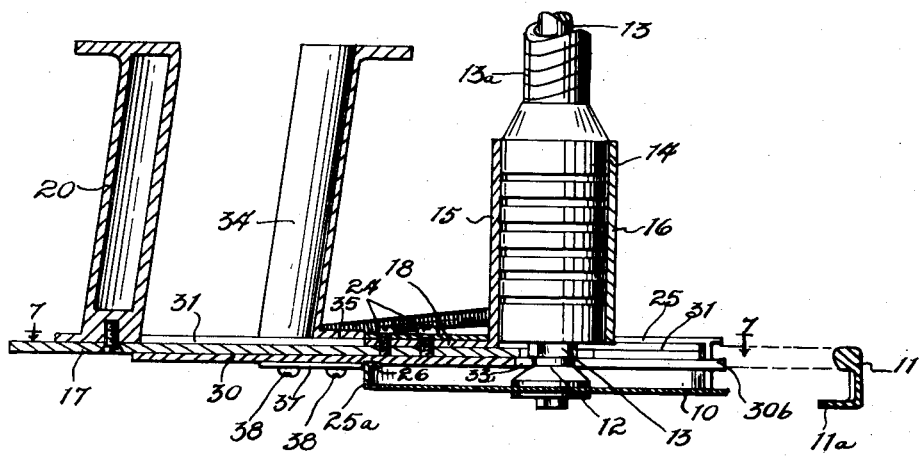
Figure 5 is a sectional view taken on the line 5—5 of Figure 1.
Figure 6:
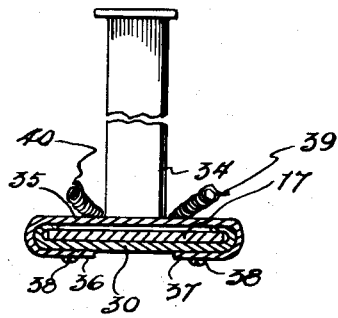
Figure 6 is a fragmentary sectional view taken on the line 6—6 of Figure 3.

The hook 11 is carried by a sliding bar 30 which has its side edges 31 and 32 turned over the member 17 to make sliding engagement with the member 17 and guide the hook 11 in its movements toward and away from the saw. The bar 30 is cut away at 33 to clear the arbor 12 and to leave a space between the hook carrying arm 30a and the opposite arm 30b of the bar 30 directly over the saw. A hand grip 34 has a base plate 35 thereon which overlies the flanges 31 and 32 of the member 30. This base plate has its side edges bent around the member 30 as shown at 36 and 37 and these side edges are secured to the bar 30 by screws 38. Two springs 39 and 40 are secured to the base plate 35 by hooks 41 and 42 and extend forwardly to secure members 43 that are carried by the split sleeve half 15. The springs 39 and 40 are under tension so that normally they force the bar 30 and the hook 11 to the left as shown in Figure 1 so as to bring the plate 35 against the rear edge of the guard 25 and to hold the hook 11 spaced from the saw 10 the maximum distance permissible.

The hook 11 is provided with a curved toothed horn engaging portion 11a that is offset downwardly so as to lie just below the plane of the saw 10. The flange 25a of the guard 25 extends downwardly far enough to protect the edge of the saw so that it will not engage and cut anything at the sides thereof.

The flexible shaft 13 may of course be driven from any suitable source of power such as an electric motor or an internal combustion engine. The device itself is held in the hands by means of the hand grips 20 and 24 and a hand grip 44 which is rigidly attached to the member 15. I have shown the device in the drawings with a switch 45 attached to the hand grip 44 and control conductors 46 leading from the switch 45 so that the operator can stop and start the saw by manipulation of the switch lever 47. The conductors 46 may be carried to the motor by attaching them to the sheath 13a of the flexible shaft 13. Where the device is operated by an internal combustion engine, a suitable control for the engine may be substituted for the switch 45.

In operation the cattle are usually placed in a chute and their heads are clamped against movement. The operator removes the horns by hooking the hook 11 around the horn and then squeezing the hand grips 20 and 34 toward each other with one hand while he holds the device with the other hand on the hand grip 44. As the hand grips 20 and 34 are brought together, the hook 11 is forced toward the saw 10 to cause the saw to cut the horn. The saw 10 is rotated at high speed and only a few seconds are required to remove the horn. As soon as one horn is removed, the operator releases the grip and the springs 39 and 40 retract the hook 11 so that the other horn can be engaged and sawed off. I have found that with this device the dehorning is accomplished so quickly that the animal has little time in which to get excited. The horn is cut off cleanly and my experience has been that the cattle bleed very little from the sawing and that they will usually go about their feeding with practically no apparent discomfort. In over a hundred of the dehorning, only one interruption of the animal's feeding was noticed and this apparently was due to the fact that the animal was overheated in getting it to the chute.

It is believed that the nature and advantages of my invention will be clear from the foregoing description.

Having thus described my invention, I claim:

1. A dehorning device comprising a circular saw, a shaft carrying the saw, a bearing mounting the shaft, a clamp for said bearing, a guard carried by the clamp and overlying the major portion of the saw, a guide plate attached to the clamp and extending away from the clamp in a direction parallel to the saw, a hand grip on said plate spaced from the clamp, a horn hook spaced from the saw in a direction opposite to the direction in which the guide plate extends, supporting means for the horn hook slidably mounted on the guide plate, a second hand grip mounted on said supporting means between the clamp and the hand grip on the guide plate, and spring means urging the second hand grip toward the clamp.

2. A dehorning device comprising a circular saw, a shaft carrying the saw, a bearing mounting the shaft, a clamp for said bearing, a guard carried by the clamp and overlying the major portion of the saw, a guide plate attached to the clamp and extending away from the clamp in a direction parallel to the saw, a hand grip on said plate spaced from the clamp, a horn hook spaced from the saw in a direction opposite to the direction in which the guide plate extends, supporting means for the horn hook slidably mounted on the guide plate supporting the hook for movement toward and away from the saw, the hook having a toothed flange parallel to the saw but offset with respect to the plane of the saw to overlap with the saw when the hook is moved into juxtaposition to the saw, a second hand grip mounted on said supporting means between the clamp and the hand grip on the guide plate, and spring means urging the second hand grip toward the clamp.

3. A dehorning device comprising a circular saw, a shaft carrying the saw, a bearing mounting the shaft, a clamp for said bearing, a guard carried by the clamp and overlying the major portion of the saw, a guide plate attached to the clamp and extending away from the clamp in a direction parallel to the saw, a hand grip on said plate spaced from the clamp, a horn hook spaced from the saw in a direction opposite to the direction in which the guide plate extends, supporting means for the horn hook slidably mounted on the guide plate supporting the hook for movement toward and away from the saw, the hook having a toothed flange parallel to the saw but offset with respect to the plane of the saw to overlap with the saw when the hook is moved into juxtaposition to the saw, a second hand grip mounted on said supporting means between the clamp and the hand grip on the guide plate and including means limiting the movement of the horn hook toward and away from the saw, and spring means urging the second hand grip toward the clamp.

4. A dehorning device comprising a circular saw, a shaft carrying the saw, a bearing mounting the shaft, a clamp for said bearing, a guard carried by the clamp and overlying the major portion of the saw, said guard including a flange extending down to the level of the saw, a guide plate attached to the clamp and extending away from the clamp in a direction parallel to the saw, a hand grip on said plate spaced from the clamp, a horn hook spaced from the saw in a direction opposite to the direction in which the guide plate extends, supporting means for the horn hook slidably mounted on the guide plate, a second hand grip mounted on said supporting means between the clamp and the hand grip on the guide plate, and spring means urging the second hand grip toward the clamp.

5. A dehorning device comprising a circular saw, a drive shaft carrying the saw, a support for said shaft having a laterally projecting handle thereon, a flanged saw guard on said support, a horn hook aligned with the saw and spaced from the saw, the guard being cut away adjacent to the horn hook to admit a horn held by the hook to the saw, means slidably mounting the horn hook on said support for movement toward and away from the saw, spring means urging the horn hook away from the saw and a pair of hand grips, one secured to the support and the other connected to the horn hook for pulling the hook toward the saw.

ALLAN L. OTIS.

No references cited.